(No Model.)
M. SVAGROVSKY.
TUBE.
No. 566,243.  Patented Aug. 18, 1896.
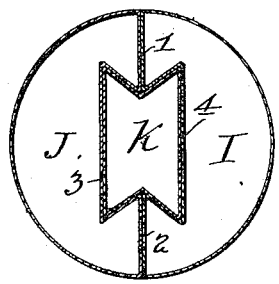
Fig. 1.
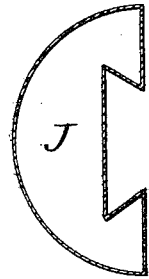  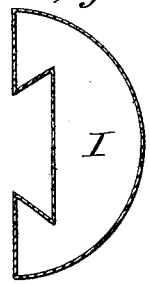
Fig. 2.  Fig. 3.  Fig. 4.
Attest  
Walter Donaldson  
C. S. Middlein
Inventor  
Max Svagrovsky  
by Richards & Co.  
Attys.

UNITED STATES PATENT OFFICE.

MAX SVAGROVSKY, OF PRAGUE, AUSTRIA-HUNGARY.

TUBE.

SPECIFICATION forming part of Letters Patent No. 566,243, dated August 18, 1896.

Application filed January 17, 1896. Serial No. 575,889. (No model.)

*To all whom it may concern:*

Be it known that I, MAX SVAGROVSKY, of Prague, Bohemia, Austria-Hungary, have invented certain new and useful Improvements in Tubes for Bicycles and the Like, of which the following is a specification.

It is my object to construct a tube for bicycles and the like having inner stiffening-walls.

My invention is illustrated in the accompanying drawings, in which—

Figure 1 is a transverse sectional view of the tube composed of three interlocked sections. Figs. 2, 3, and 4 show the several sections detached.

This tube does not require any welding or soldering, and is composed of outer sections J I, having dovetail grooves in their opposing faces, and an inner section K, composed of two double dovetail portions which fit into the dovetail grooves of the sections J and I and lock the same together. The meeting walls of these several sections form inner strengthening-walls 1, 2, 3, and 4 for the main tube and connect the upper and lower periphery thereof, thus adding to the strength of the structure and at the same time avoiding all welded and soldered joints.

I am aware that prior to my invention hollow tubes have been used with inward reinforcing, and I do not claim such, broadly; but

What I claim is—

A tube made up of sections each one of which is hollow and which are dovetailed the one into the other, said sections when brought together forming interior strengthening-walls, substantially as described.

In witness whereof I have hereunto set my hand in presence of two witnesses.

MAX SVAGROVSKY.

Witnesses:
L. VOJAIEL,
ADOLPHE FISCHER.